(12) United States Patent
Han et al.

(10) Patent No.: US 7,780,312 B2
(45) Date of Patent: Aug. 24, 2010

(54) BACKLIGHT ASSEMBLY FOR LIQUID CRYSTAL DISPLAY DEVICE AND LIQUID CRYSTAL DISPLAY DEVICE USING THE SAME

(75) Inventors: Gil-Won Han, Gyeonggi-do (KR); Hee-Jung Hong, Seoul (KR); Moo-Jong Lim, Seoul (KR); Ju-Young Bang, Seoul (KR); Jong-Hyun Choi, Incheon (KR)

(73) Assignee: LG Display Co., Ltd., Seoul (KR)

( * ) Notice: Subject to any disclaimer, the term of this patent is extended or adjusted under 35 U.S.C. 154(b) by 445 days.

(21) Appl. No.: 11/443,258

(22) Filed: May 31, 2006

(65) Prior Publication Data

US 2006/0279671 A1 Dec. 14, 2006

(30) Foreign Application Priority Data

May 31, 2005 (KR) .................. 10-2005-0046273
Nov. 15, 2005 (KR) .................. 10-2005-0109218

(51) Int. Cl.
*F21V 1/00* (2006.01)

(52) U.S. Cl. .................. 362/235; 362/800; 362/249.02; 362/613; 362/217.04; 362/225

(58) Field of Classification Search ......... 362/600–630, 362/60, 249.02, 311.02, 225, 217.04
See application file for complete search history.

(56) References Cited

U.S. PATENT DOCUMENTS

| | | | | |
|---|---|---|---|---|
| 4,254,453 | A * | 3/1981 | Mouyard et al. | 362/240 |
| 6,923,548 | B2 * | 8/2005 | Lim | 362/612 |
| 7,008,080 | B2 * | 3/2006 | Bachl et al. | 362/249 |
| 7,153,013 | B2 * | 12/2006 | Pederson | 362/543 |
| 7,158,019 | B2 * | 1/2007 | Smith | 340/467 |
| 7,204,604 | B2 * | 4/2007 | Chou | 362/227 |
| 7,637,626 | B2 * | 12/2009 | Park et al. | 362/97.3 |
| 7,674,011 | B2 * | 3/2010 | Zhou et al. | 362/249.02 |
| 2004/0218388 | A1 | 11/2004 | Suzuki et al. | |
| 2005/0169007 | A1 | 8/2005 | Chou et al. | |
| 2005/0259195 | A1 | 11/2005 | Koganezawa et al. | |
| 2006/0002148 | A1 | 1/2006 | Kim et al. | |
| 2006/0061539 | A1 | 3/2006 | Song et al. | |

(Continued)

FOREIGN PATENT DOCUMENTS

CN 1534339 A 10/2004

(Continued)

OTHER PUBLICATIONS

Office Action issued Nov. 10, 2009 in corresponding Japanese Application No. 2006-152334.

(Continued)

*Primary Examiner*—Anabel M Ton
(74) *Attorney, Agent, or Firm*—Holland & Knight LLP (57) ABSTRACT

A backlight assembly for a liquid crystal display device includes a bottom frame having an inner surface, printed circuit boards on the inner surface, and a plurality of light emitting diodes in rectangular-shaped clusters on each of the printed circuit boards, each of the light emitting diode clusters includes four light emitting diodes.

27 Claims, 11 Drawing Sheets

U.S. PATENT DOCUMENTS

| | | | |
|---|---|---|---|
| 2006/0087866 A1 | 4/2006 | Ng et al. | |
| 2006/0181872 A1* | 8/2006 | Pashley | 362/231 |
| 2007/0002590 A1* | 1/2007 | Jang et al. | 362/633 |
| 2008/0259240 A1* | 10/2008 | Song et al. | 349/62 |
| 2008/0303757 A1* | 12/2008 | Ohkawa et al. | 345/82 |

FOREIGN PATENT DOCUMENTS

| | | | |
|---|---|---|---|
| CN | 1614657 A | 5/2005 | |
| EP | 1 669 796 A1 | 6/2006 | |
| EP | 1 741 973 A2 | 1/2007 | |
| JP | 2001154613 A | 6/2001 | |
| JP | 2001-210122 A | 8/2001 | |
| JP | 2002-280617 A | 9/2002 | |
| JP | 2003-316298 A | 11/2003 | |
| JP | 2004-206916 A | 7/2004 | |
| JP | 2005-108519 A | 4/2005 | |
| JP | 2005-310751 A | 11/2005 | |
| JP | 2006-310043 A | 11/2006 | |
| WO | WO 2005/043230 A1 | 5/2005 | |

OTHER PUBLICATIONS

Office Action issued Feb. 22, 2010 in corresponding Japanese Application No. 2006-152334.

* cited by examiner

BACKLIGHT ASSEMBLY FOR LIQUID CRYSTAL DISPLAY DEVICE AND LIQUID CRYSTAL DISPLAY DEVICE USING THE SAME

The present application claims the benefit of Korean Patent Application No. Korean Patent Application No. P2005-046273 filed in Korea on May 31, 2005 and P2005-0109218 filed in Korea on Nov. 15, 2005, which are both hereby incorporated by reference in their entirety.

BACKGROUND OF THE INVENTION

1. Field of the Invention

The present invention relates to a backlight assembly, and more particularly, to a backlight assembly for a liquid crystal display device and a liquid crystal display device using the same. Although the present invention is suitable for a wide scope of applications, it is particularly suitable for an arrangement in which light emitting diodes (LEDs) are used as light sources in a backlight assembly.

2. Discussion of the Related Art

In general, a display device portrays information as visual images. As communication technology has developed, a need for compact display devices has developed. Such display device can be classified as either a self-emitting type or a non-emitting type. A liquid crystal display (LCD) device is representative of a non-emitting type display device.

Since the LCD device is not a self-emitting type of display device, the LCD device requires an external light source. Accordingly, a backlight assembly, having a fluorescent lamp, is disposed on a rear surface of the LCD device. The backlight assembly radiates light into the liquid crystal panel of the LCD device, so that the LCD device can display visual images. The backlight assembly includes a light source, such as a cold cathode fluorescent lamp (CCFL), an external electrode fluorescent lamp (EEFL), and/or LEDs. Among these light sources, LEDs have the characteristics of small size, low power consumption and stability. Accordingly, LEDs are becoming widely used as light sources in backlights for LCD devices.

Figure 1:
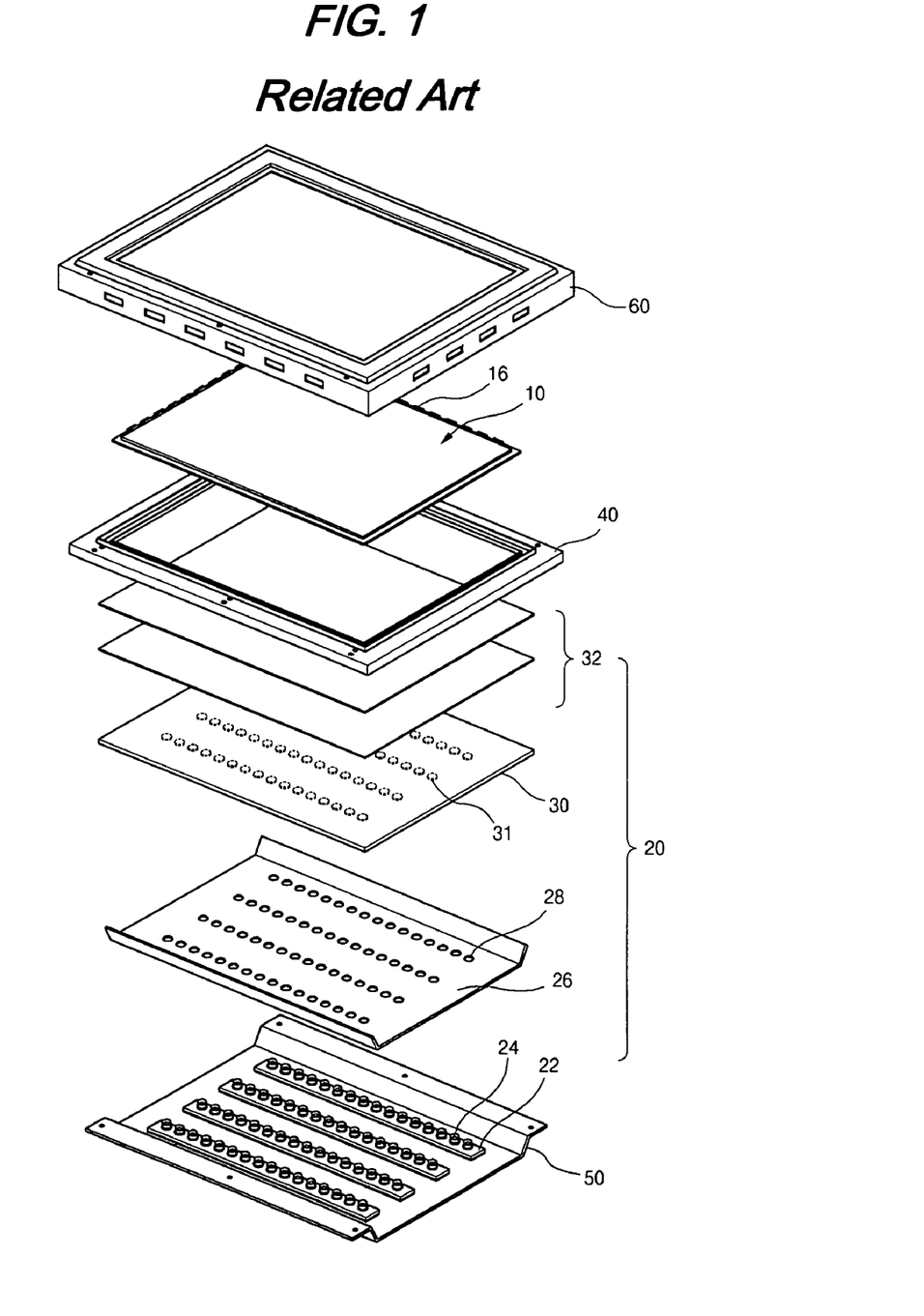
FIG. 1 is an exploded perspective view of an LCD device according to the related art using LEDs as a light source.

FIG. 1 is an exploded perspective view of an LCD device using LEDs as a light source according to the related art. As shown in FIG. 1, the LCD device includes a liquid crystal panel 10, a backlight assembly 20, a main frame 40, a bottom frame 50 and a top frame 60. The liquid crystal panel 10 includes first and second substrates (not shown), facing each other with a liquid crystal layer (not shown) interposed between the first and second substrates, and a printed circuit board (PCB) 16 adjacent to the edge of the liquid crystal panel 10. The main frame 40 surrounds the sides of the liquid crystal panel 10 and the backlight assembly 20. The bottom frame 50 covers a rear surface of the backlight assembly 20 and can be attached to the main frame 40. The top frame 60 surrounds an edge of the liquid crystal panel 10 and can be attached to the main frame 40.

The backlight assembly 20 includes metal core printed circuit boards (MCPCBs) 22, LEDs 24, a reflecting sheet 26, a transparent window 30 and optical sheets 32. The MCPCBs 22 are disposed spaced apart from each other on an inner surface of the bottom frame 50. A plurality of LEDs 24 are disposed on each of the MCPCBs 22. The reflecting sheet 26 has through-holes 28 corresponding to the LEDs 24, respectively. The reflecting sheet 26 has a white or silver color. The reflecting sheet 26 covers the MCPCBs 22 and the inner surface of the bottom frame 50 such that the LEDs 24 protrude through the through-holes 28, respectively. The transparent window 30 has diverters 31 respectively corresponding to the LEDs 24. The optical sheets 32 can include a prism sheet, a diffusion sheet and other types of optical sheets. The transparent window 30 and the optical sheets 32 are sequentially disposed over the reflecting sheet 26.

Figure 2:
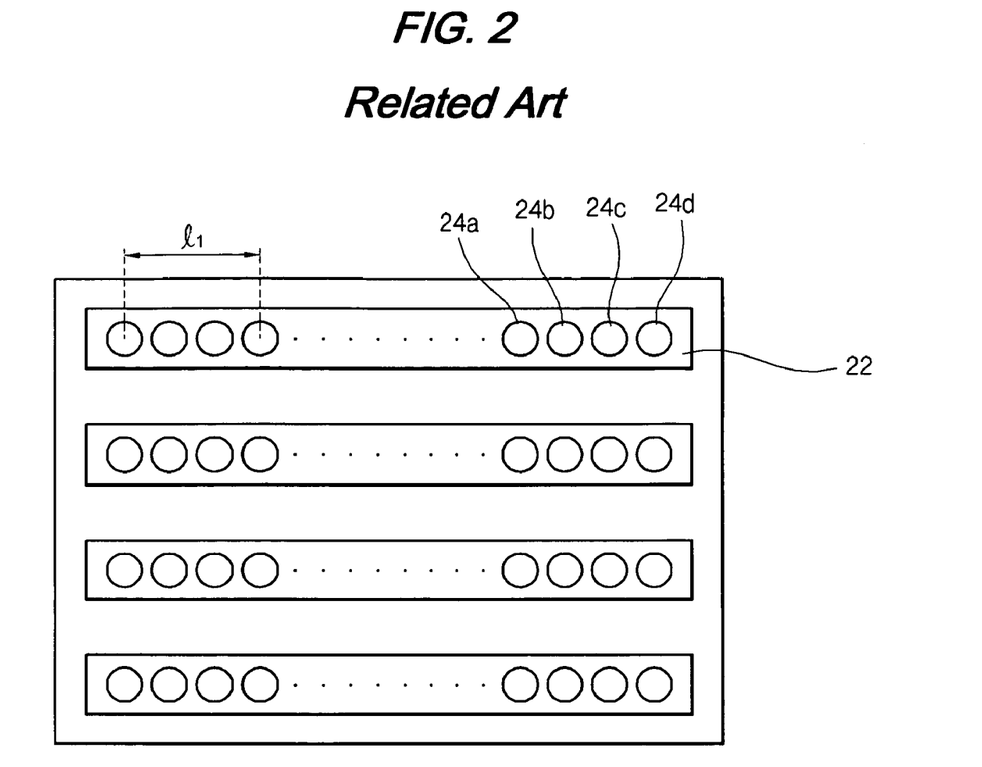
FIG. 2 is a schematic view illustrating a sequential arrangement of LED strings of green, red, blue and green LEDs according to the related art.

FIG. 2 is a schematic view illustrating a sequential arrangement of LED strings of green, red, blue and green LEDs according to the related art. As shown in FIG. 2, a plurality of LED strings 24 are arranged on each of the MCPCBs 22. The MCPCBs 22 are arranged spaced apart from each other by a distance of about 60 mm on the inner surface of the bottom frame (50 of FIG. 1). Each of the LED strings 24 includes four LEDs in which the first and fourth LEDs are green LEDs 24a and 24d, the second LED is a red LED 24b and the third LED is a blue LED 24c. The plurality of LED strings 24 on each of the MCPCBs 22 emit light into the liquid crystal panel (10 of FIG. 1) and have a length $l_1$ of about 40 mm. However, when the four LEDs 24a, 24b, 24c and 24b having green, red, blue and green colors, respectively, are used as an LED string in a backlight assembly (20 of FIG. 1), the brightness of the red LED 24b having a red color is not sufficient for proper color rendering on the liquid crystal panel (10 of FIG. 1).

Figure 3:
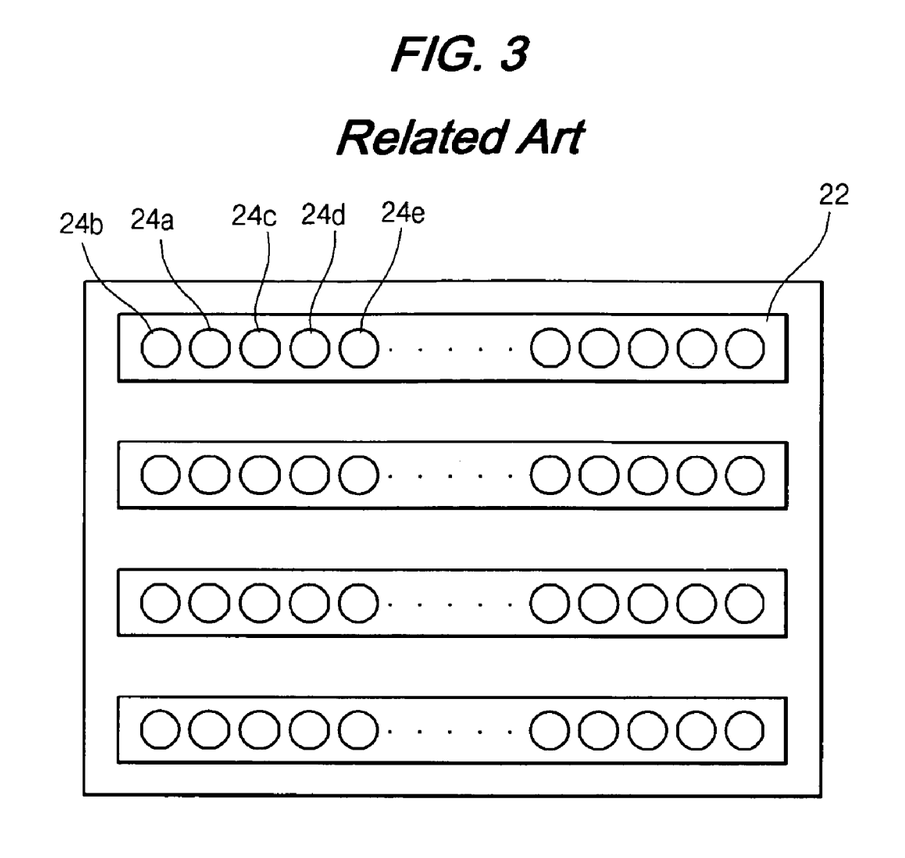
FIG. 3 is a schematic view illustrating a sequential arrangement of LED strings of red, green, blue, green and red LEDs according to the related art.

FIG. 3 is a schematic view illustrating a sequential arrangement of LED strings of red, green, blue, green and red LEDs according to the related art. As shown in FIG. 3, a plurality of LED strings 25 sequentially arranged on the MCPCBs 22 are used as a light source of the backlight assembly (20 of FIG. 1) to resolve the insufficient brightness of the red LED 25b. Each LED string has five LEDs in which the second and fourth LEDs are green LEDs 25a and 25d, the first and fifth LEDs are red LEDs 25b and 25e, and the third is a blue LED 25c. A plurality of LED strings 25 are arranged on each of the MCPCBs 22. The MCPCBs 22 are arranged spaced apart from each other on the inner surface of the bottom frame (50 of FIG. 1).

Figure 4:
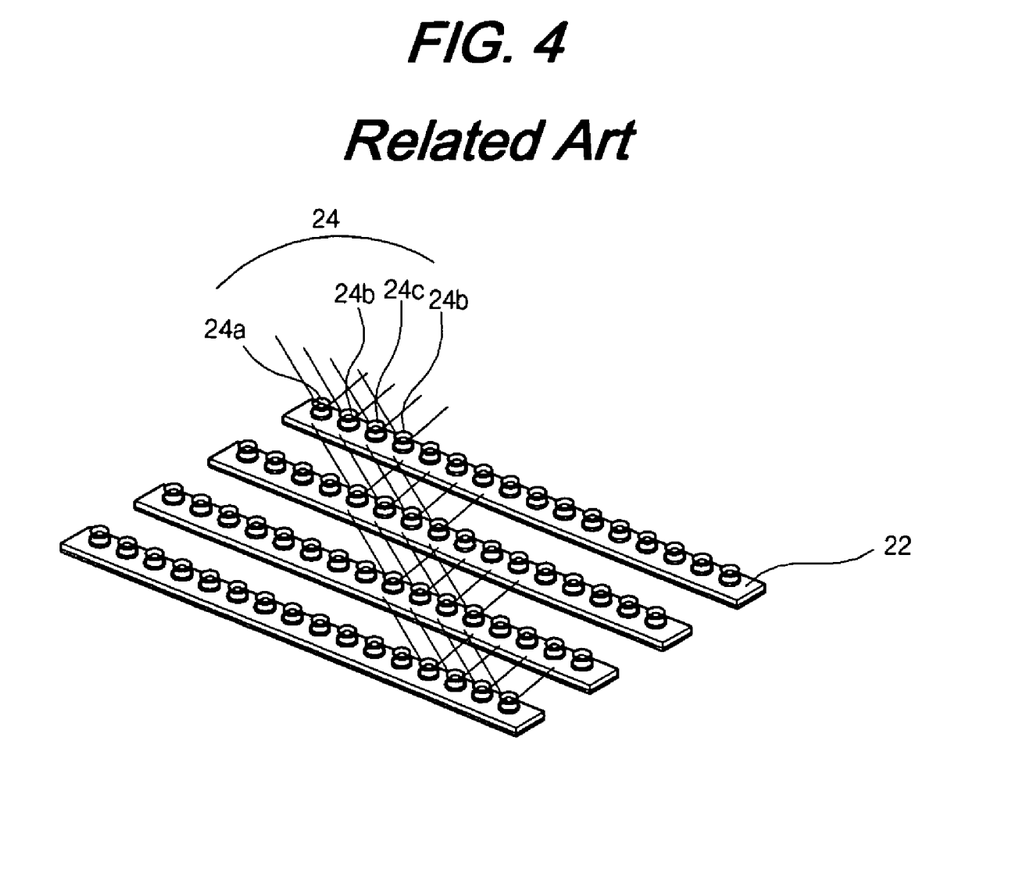
FIG. 4 is a schematic perspective view illustrating LED strings using the method of field sequential control according to the related art.

FIG. 4 is a schematic perspective view illustrating LED strings using the method of field sequential control according to the related art. As shown in FIG. 4, a white light is produced by strobing a plurality of LED strings 25 at the same time and mixing the red, green, blue, green and red colors. The plurality of LED strings 25 may be strobed at the same time using a field sequential control (FSC). When the FSC is used, moving images are displayed on the liquid crystal panel (10 of FIG. 1) without image blur.

When the plurality of LED strings 24 or 25 having four or five LEDs are arranged on the MCPCB, the distance between adjacent LEDs on the MCPCB is close. The LEDs have an elliptical shape so as to mix and produce white light. The LCD device according to the related art has problems. For example, the close spacing concentrates heat buildup amongst the LEDs. Heat emitted from each of the LEDs decreases the life span of the LEDs if the heat is not dissipated away from the LEDs. Thus, an LCD device according to the related art using LEDs as a light source can have a short life span. Each of the LED strings 24 or 25 on the MCPCBs 22 can not be sectionally strobed to increase contrast because a combination of LED strings are needed to create white light. Since sectional control of the LED strings on the MCPCBs is not possible, the LCD device using LEDs as a light source according to the related art may have a low contrast.

SUMMARY OF THE INVENTION

Accordingly, the present invention is directed to a backlight assembly for a liquid crystal display device and a liquid crystal display device using the same that substantially obviate one or more of the problems due to limitations and disadvantages of the related art.

An object of the present invention is to provide a backlight assembly for a liquid crystal display device and a liquid crystal display device using the same for increasing brightness.

Another object of the present invention is to provide a backlight assembly for a liquid crystal display device and a liquid crystal display device using the same for increasing contrast.

An object of the present invention is to provide a backlight assembly for a liquid crystal display device and a liquid crystal display device using the same for preventing a life span decrease.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a backlight assembly for a liquid crystal display device includes a bottom frame having an inner surface, printed circuit boards on the inner surface, and a plurality of light emitting diodes in rectangular-shaped clusters on each of the printed circuit boards, each of the light emitting diode clusters includes four light emitting diodes.

In another aspect of the present invention, a backlight assembly for a liquid crystal display device includes a bottom frame having an inner surface, a printed circuit board on the inner surface, and a plurality of light emitting diode clusters on the printed circuit board, each of the plurality of light emitting diode clusters includes five light emitting diodes in which four light emitting diodes of the five light emitting diodes are arranged in a rectangular shape and one light emitting diode of the five light emitting diodes is at a center of the rectangular shape.

In another aspect of the present invention, a liquid crystal display device has a backlight assembly including: a bottom frame having an inner surface; a printed circuit board on the inner surface; a plurality of light emitting diodes in rectangular-shaped clusters on each of the printed circuit boards, each of the plurality of light emitting diode clusters includes four light emitting diodes; a reflecting sheet having through-holes corresponding to the light emitting diodes, the reflecting sheet covering the printed circuit board and the inner surface of the bottom frame; a transparent window on the reflecting sheet, the transparent window having diverters corresponding to the four light emitting diodes of each of the light emitting diode clusters; and a plurality of optical sheets on the transparent window, and a liquid crystal panel on the plurality of optical sheets, a main frame surrounding the backlight assembly and the liquid crystal panel, and a top frame surrounding a front edge of the liquid crystal panel.

In another aspect of the present invention, a liquid crystal display device has a backlight assembly including: a bottom frame having an inner surface; a printed circuit board on the inner surface; a plurality of light emitting diodes in rectangular-shaped clusters on each of the printed circuit boards, each of the plurality of light emitting diode clusters includes five light emitting diodes arranged in a rectangular shape and one light emitting diode of the five light emitting diodes is at a center of the rectangular shape; a reflecting sheet having through-holes corresponding to the light emitting diodes, the reflecting sheet covering the printed circuit board and the inner surface of the bottom frame; a transparent window on the reflecting sheet, the transparent window having a plurality of diverters corresponding to the five light emitting diodes of each of the light emitting diode clusters; and a plurality of optical sheets on the transparent window, and a liquid crystal panel on the plurality of optical sheets, a main frame surrounding the backlight assembly and the liquid crystal panel, and a top frame surrounding a front edge of the liquid crystal panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments, examples of which are illustrated in the accompanying drawings.

Figure 5:
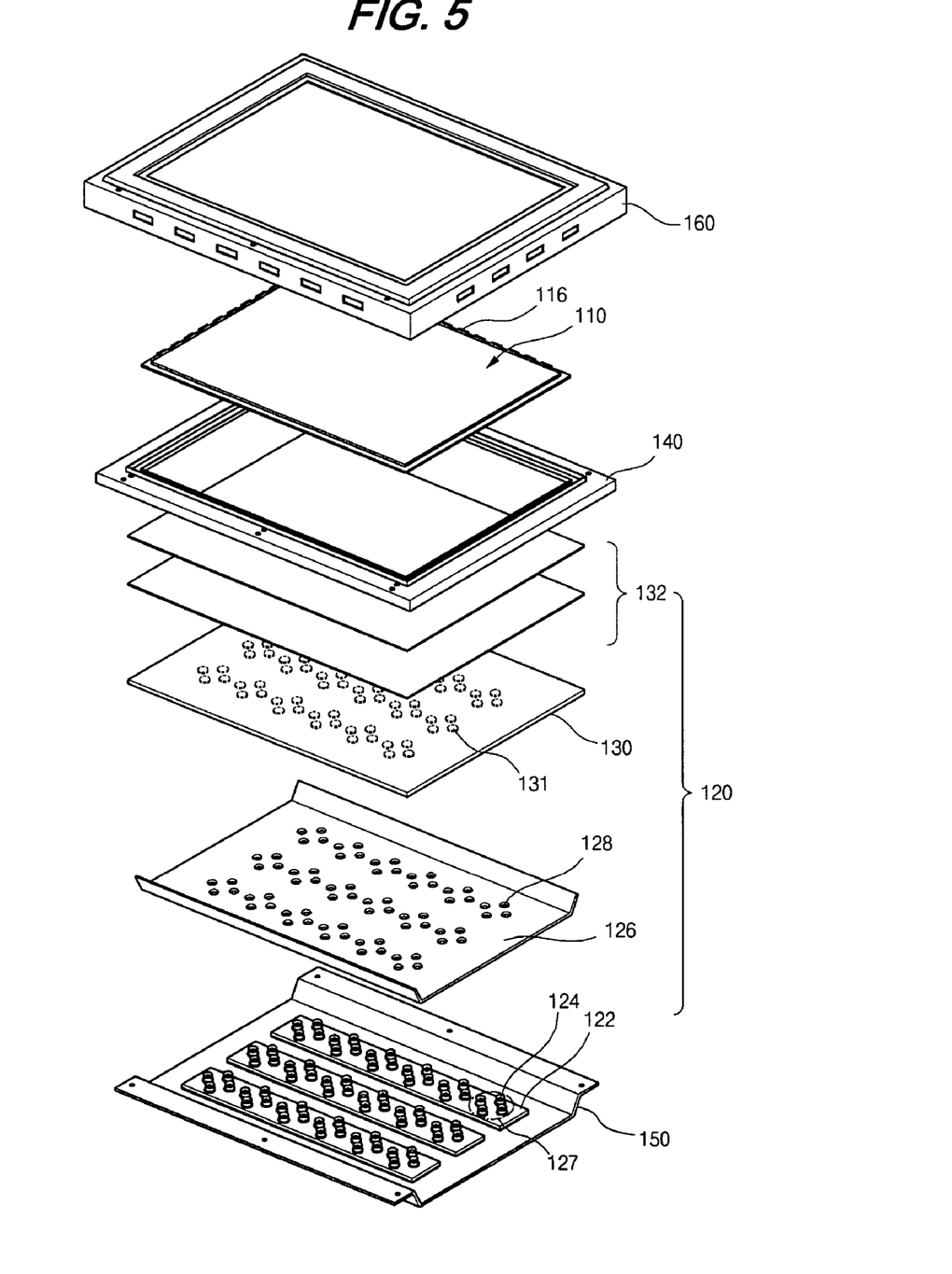
FIG. 5 is an exploded perspective view of an LCD device using LEDs as a light source in a backlight according to a first exemplary embodiment of the present invention.

FIG. 5 is an exploded perspective view of an LCD device using LEDs as a light source in a backlight according to a first exemplary embodiment of the present invention. As shown in FIG. 5, the LCD device includes a liquid crystal panel 110, a backlight assembly 120, a main frame 140, a bottom frame 150 and a top frame 160. The liquid crystal panel 110 includes first and second substrates facing each other (not shown), a liquid crystal layer (not shown) interposed between the first and second substrates, and a PCB 116 adjacent to the edge of the liquid crystal panel 110. The main frame 140 surrounds the sides of the liquid crystal panel 110 and the backlight assembly 120. The bottom frame 150 covers a rear surface of the backlight assembly 120 and can be attached to the main frame 140. The top frame 160 surrounds an edge of the liquid crystal panel 110 and can be attached to the main frame 140.

The backlight assembly 120 includes metal core printed circuit boards (MCPCBs) 122, LED clusters 127, a reflecting sheet 126, a transparent window 130 and optical sheets 132. The MCPCBs 122 are arranged separated from each other on an inner surface of the bottom frame 150. A plurality of LED clusters 127 are disposed on each of the MCPCBs 122. The LED clusters 127 include four LEDs 124 having green, blue and red colors. The four LEDs 124 of the LED clusters 127 are arranged in a rectangular shape, such as a diamond shape. The reflecting sheet 126 has through-holes 128 corresponding to the four LEDs 124, respectively. The reflecting sheet 126 can be white or silver in color. The reflecting sheet 126 covers the MCPCBs 122 and the inner surface of the bottom frame 150, so that the four LEDs 124 of each of the LED clusters 127 protrude through the through-holes 128. The transparent window 130 has diverters 131 corresponding to the four LEDs 124 of each of the LED clusters 127. The optical sheets 132 can include a prism sheet, a diffusion sheet and other types of optical sheets. Accordingly, light, which is directly emitted from each of the four LEDs 124 or reflected on the reflecting sheet 126, is dispersed by the plurality of diverters 131 of the transparent window 130 and provided through the optical sheets 132 such that planar light is provided into the liquid crystal panel 110 to display high quality images.

Figure 6:
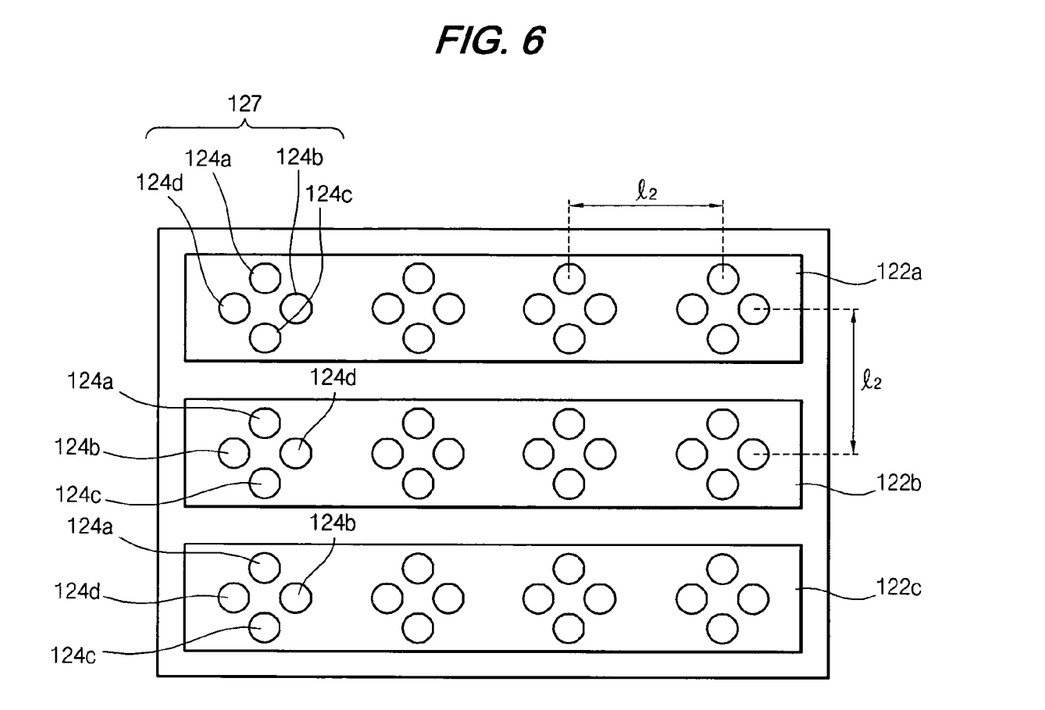
FIG. 6 is a schematic perspective view of an arrangement of the LED clusters according to the first exemplary embodiment of the present invention.

FIG. 6 is a schematic perspective view of an arrangement of the LED clusters according to the first exemplary embodiment of the present invention. As shown in FIG. 6, a plurality of LED clusters 127 are arranged on each of the first, the second and the third MCPCBs 122a, 122b and 122c, respectively. Each of the plurality of LED clusters 127 includes the four LEDs, which are two green LEDs 124a and 124c, a blue LED 124b and a red LED 124d. The four LEDs 124a, 124b, 124c and 124d are arranged in a diamond shape. Each of the four LEDs 124a, 124b, 124c and 124d are separated from each other so that each of the four LEDs 124a, 124b, 124c and 124d is not affected by a heat emitted from other LEDs. When the LEDs 124 are top-emitting LEDs, the LED clusters 127 are arranged at a length $l_2$ of about 20-50 mm in both the horizontal and the vertical directions. When the LEDs 124 are side-emitting LEDs, the LED clusters 127 are arranged at a length $l_2$ of about 40-200 mm in both the horizontal and the vertical directions. A whiter light is produced by mixing light emitted from the LED cluster 127 having the four LEDs 124a, 124b, 124c and 124d arranged in a diamond pattern. Since the green LED has a lower lumen efficiency than the blue LED or the red LED, each LED cluster 127 has two green LEDs 124a and 124c, a blue LED 124b and a red LED 124d so that the green, blue and red colors have the same brightness, respectively.

As mentioned above, a plurality of LED clusters 127 are arranged on each of the MCPCBs 122a, 122b and 122c, respectively. Each of the LED clusters 127 have a diamond pattern. In two adjacent MCPCBs, for example the first and second MCPCBs 122a and 122b, a relative arrangement of the red LED 124d and the blue LED 124b in the opposing LED clusters 127 are opposite with respect to each other. In other words, each LED cluster 127 of the first and third MCPCBs 122a and 122c has an arrangement in a clockwise direction of green LED 124a, blue LED 124b, green LED 124c and red LED 124d while the LED clusters 127 of the second MCPCB 122b have an arrangement in the clockwise direction of green LED 124a, red LED 124d, green LED 124c and blue LED 124b. This arrangement prevents the red LEDs from being arranged in a row. If the red LEDs were arranged in a row, a red line would appear on the liquid crystal panel (110 of FIG. 5).

Because the LED clusters have a rectangular shape, each of the of LED clusters 122 produce white light. In other words, a single LED cluster 122 can produce white light. Thus, the LED clusters 122 can be sectionally strobed to produce white light. Accordingly, the brightness of the liquid crystal panel (110 of FIG. 5) can be sectionally controlled. In addition, contrast can increase by turning OFF LED clusters behind regions of the liquid crystal panel displaying dark images and turning ON LED clusters in regions of the liquid crystal panel displaying bright images.

The distance between two adjacent LEDs 124 within an LED cluster 127A is greater than the distance between two adjacent LEDs in the related art LED cluster. Further, the distance between two adjacent LED clusters on a MCPCB 122 is at least twice as much as the distance between two adjacent LEDs 124 within an LED cluster 127. Because an LED in the backlight assembly according to the first embodiment of present invention is at greater distance away from other LEDs than the distance between adjacent LEDs in the related art, the problem of the life span of an LED being decreased by heat emitted from other LEDs is resolved.

Figure 7:
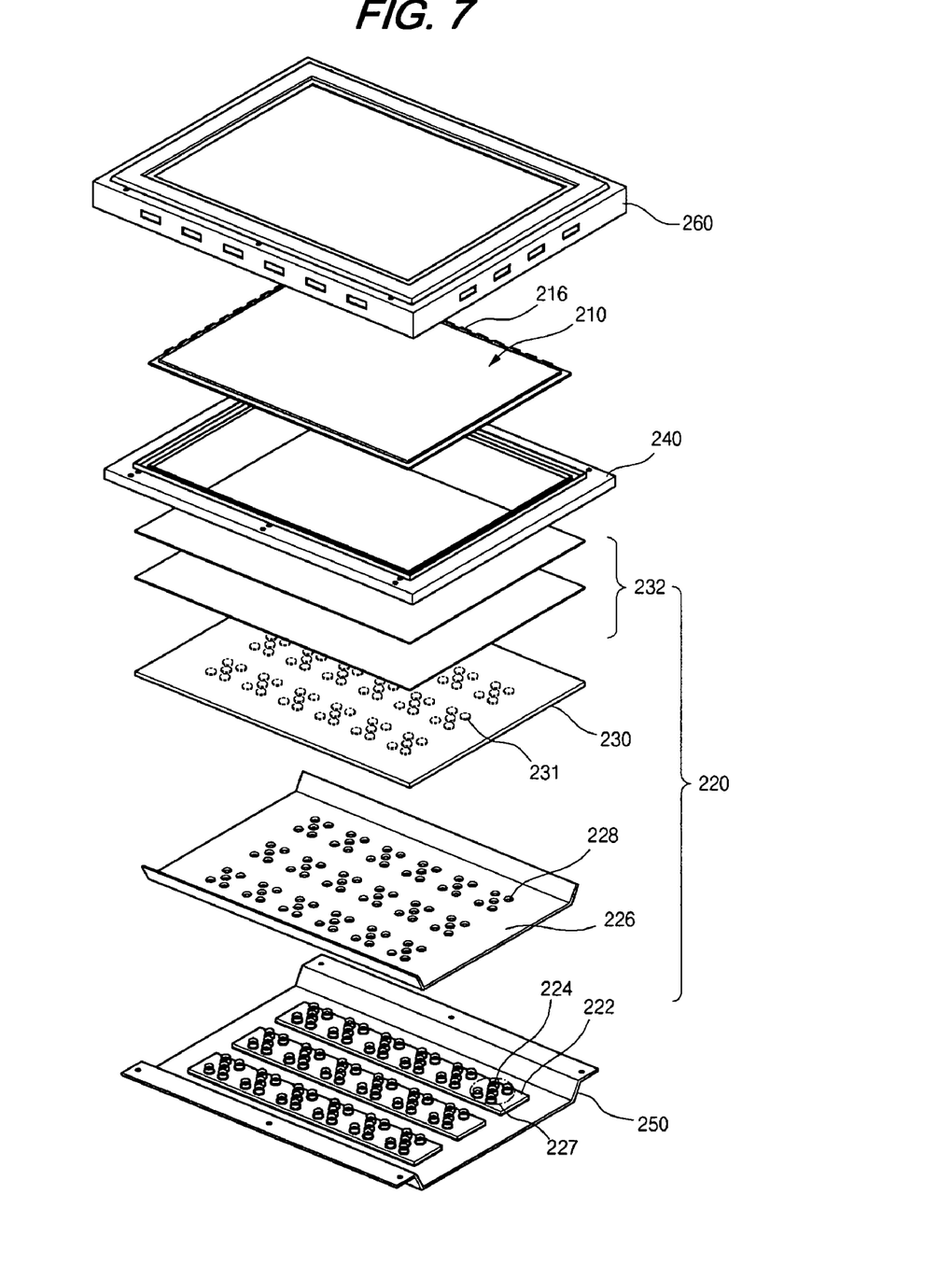
FIG. 7 is an exploded perspective view of an LCD device using LEDs as a light source in a backlight according to a second exemplary embodiment of the present invention.
Figure 8:
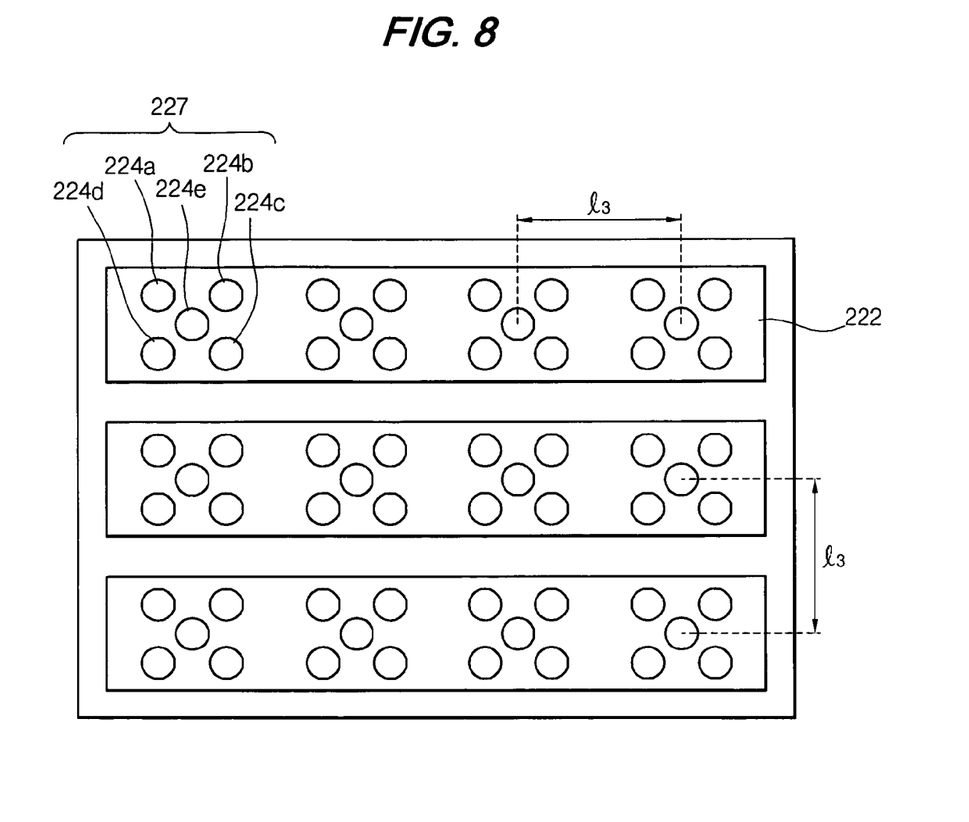
FIG. 8 is a schematic perspective view of an arrangement of the LED clusters according to the second exemplary embodiment of the present invention.

FIG. 7 is an exploded perspective view of an LCD device using LEDs as a light source in a backlight according to a second exemplary embodiment of the present invention, and FIG. 8 is a schematic perspective view of an arrangement of the LED clusters according to the second exemplary embodiment of the present invention. As shown in FIG. 7, the LCD device includes a liquid crystal panel 210, a backlight assembly 220, a main frame 240, a bottom frame 250 and a top frame 260. The backlight assembly 220 includes MCPCBs 222, LED clusters 227, a reflecting sheet 226, a transparent window 230 and optical sheets 232.

The MCPCBs 222 are disposed spaced apart from each other on an inner surface of the bottom frame 250. A plurality of LED clusters 227 are disposed on each of the MCPCBs 222. Each of the LED clusters 227 include five LEDs 224. The reflecting sheet 226 has a through-holes 228 corresponding to the five LEDs 224 of each of the LED clusters 227. The reflecting sheet 226 can be white or silver in color. The reflecting sheet 226 covers the MCPCBs 222 and the inner surface of the bottom frame 250 so that the five LEDs 224 of each of the LED clusters 227 protrude through the through-holes 228. The transparent window 230 has diverters 231 corresponding to the five LEDs 224 of each of the LED clusters 227. The plurality of optical sheets 232 can include a prism sheet, a diffusion sheet and other types of optical sheets.

As shown in FIG. 8, a plurality of rectangular-shaped LED clusters 227 are arranged on each of the MCPCBs 222. Each of the LED clusters 227 include two green LEDs 224a and 224c, a blue LED 224b, a red LED 224d and a white LED 224e. The four colored LEDs 224a, 224b, 224c and 224d are arranged in a rectangular shape, such as a square shaped, and the white LED 224e is disposed at a center of the rectangular shape. The two green LEDs 224 and 224c are opposite to each other. The LEDs 224a, 224b, 224c, 224d and 224e are separated from each other, so that each of the LEDs is not affected by heat emitted from another LED. The white LED 224e is disposed at the center of the rectangular shape and light from the other four LEDs mixes to produce white light. When the LEDs 224 are top-emitting LEDs, the LED clusters 227 are arranged at a length $l_3$ of about 20-50 mm in both the horizontal and the vertical directions. When the LEDs 224 are side-emitting LEDs, the LED clusters 227 are arranged at a length $l_3$ of about 40-200 mm in both the horizontal and the vertical directions. The plurality of LED clusters 227 are arranged on each of the MCPCBs 222 such that a distance between two adjacent LED clusters is as at least twice the distance between two adjacent LEDs within each LED cluster.

Figure 9:
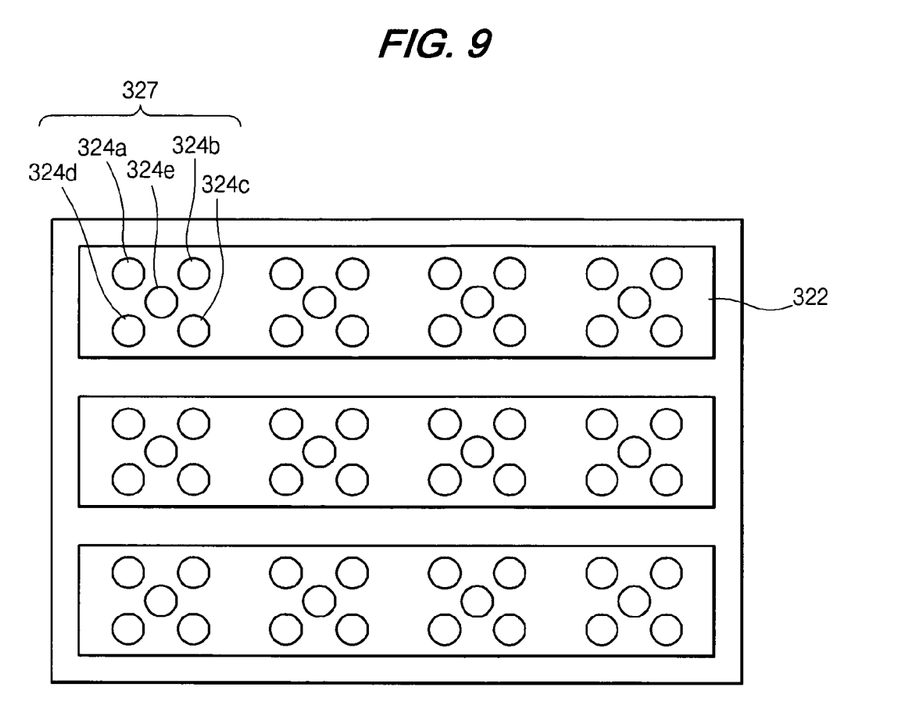
FIG. 9 is a schematic perspective view of an arrangement of the LED clusters according to a third exemplary embodiment of the present invention.

FIG. 9 is an exploded perspective view of an LCD device using LEDs as a light source in a backlight according to a third exemplary embodiment of the present invention. As shown in FIG. 9, a plurality of rectangular-shaped LED clusters 327 are arranged on each of the MCPCBs 322. Each of the rectangular-shaped LED clusters 327 include five LEDs in which two LEDS are green LEDs 324a and 324c, two LEDs are red LEDs 324b and 324d and one LED is a blue LED 324e. The two green LEDs 324a and 324c and the two red LEDs 324b and 324d are arranged in a rectangular shape, such as a square shape, and the two green LEDs 324a and 324c are opposite to each other. The blue LED 324e is disposed at a center of the rectangular shape. The LEDs 324 of the LED clusters 327 are arranged to be separated from each other enough so that the affect of heat emitted from other LEDs is decreased.

A color temperature of light displayed on the liquid crystal panel (210 of FIG. 7) rises, due to the above arrangement. The color temperature of light is an index that represents how hot the light is. For example, light of orange color has a relatively low color temperature and light of blue color has a relatively high color temperature. As the color temperature of light into the liquid crystal panel increases, the light from the liquid crystal panel increases in brightness. As mentioned above, when a LED cluster including two green LEDs, a blue LED and a red LED is used for a light source, the brightness of the red LED is low such that the temperature of light becomes low. By adding a second red LED as described above, the brightness of the red color is increased to prevent the temperature of the light from becoming low.

Figure 10:
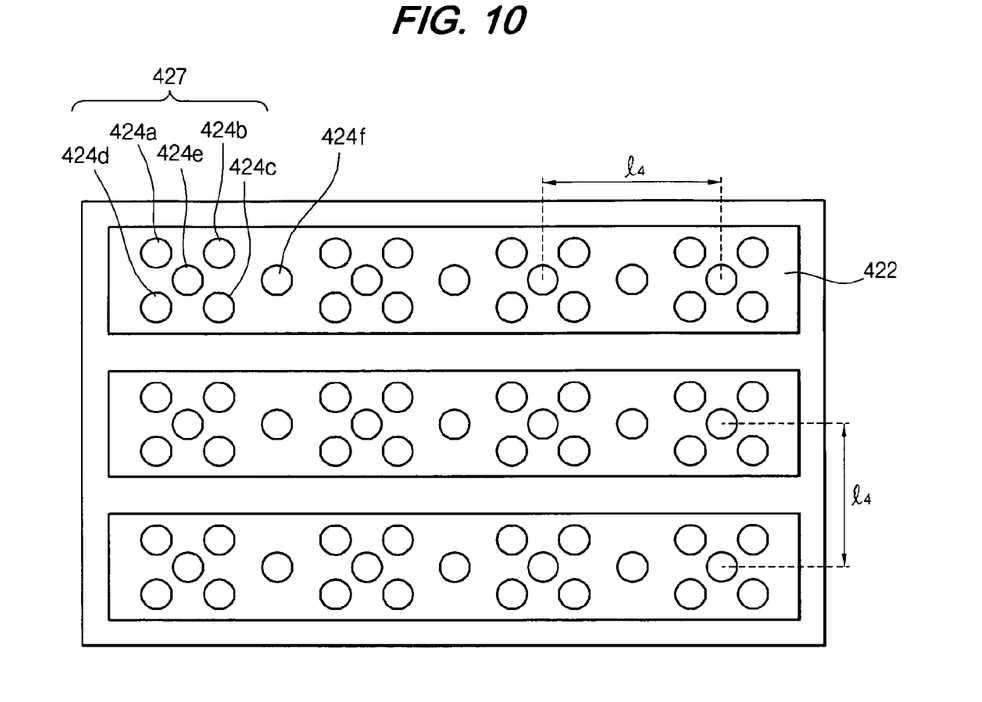
FIG. 10 is a schematic perspective view of an arrangement of the LED clusters according to a fourth exemplary embodiment of the present invention.

FIG. 10 is a schematic perspective view of an arrangement of the LED clusters according to the fourth exemplary embodiment of the present invention. A plurality of rectangular-shaped LED clusters 427 are alternately arranged with a plurality of additional LEDs 424f on each of a plurality of MCPCBs 422. The rectangular-shaped LED clusters 427 include five LEDs in which two of the LED are green LEDs 424a and 424c, two of the LEDs are red LEDs 424b and 424d and one of the LEDs is a blue LED 424e. The plurality of additional LEDs 424f can be one of red, green, blue and white color LEDs. The two green LEDs 424a and 424c and the two red LEDs 424b and 424d are arranged in a rectangular shape, such as a square shape, with the two green LEDs 424a and 424c opposite from each other. The blue LED 424e is disposed at a center of the square shape. By disposing the additional LED 424f between the LED clusters, the light emitted from the backlight assembly (220 of FIG. 7) has a high color temperature and the liquid crystal panel (210 of FIG. 7) displays bright images. When the LEDs 424 are top-emitting LEDs, the LED clusters 427 are arranged at a length $l_4$ of about 20-50 mm in both the horizontal and the vertical directions. When the LEDs 424 are side-emitting LEDs, the LED clusters 427 are arranged at a length $l_4$ of about 40-200 mm in both the horizontal and the vertical directions. Further, the LEDs 424 of the LED clusters 427 are arranged to be separated from each other enough so that the affect of heat emitted from other LEDs is decreased.

Figure 11:
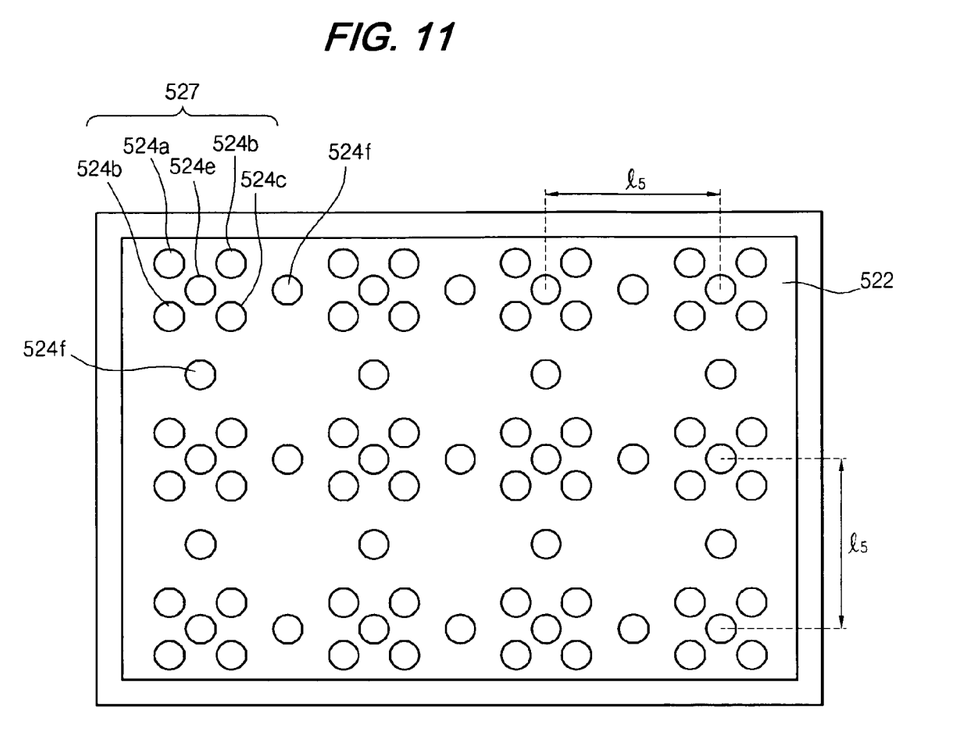
FIG. 11 a schematic perspective view of an arrangement of the LED clusters according to a fifth exemplary embodiment of the present invention.

FIG. 11 is a schematic view illustrating an arrangement of the LEDs on the each MCPCB. As shown in FIG. 11, a plurality of rectangular-shaped clusters 527 and an additional LED 524f are arranged on an MCPCB 522. The plurality of rectangular-shaped LED clusters 527 are arranged in rows on the MCPCB 522, and each row includes the additional LEDs 524f. Each of the additional LEDs 524f is disposed between adjacent rectangular-shaped LED clusters 527. The plurality of LED clusters 527 includes five LEDs, which are two green LEDs 524a and 524c, two red LEDs 524b and 524d and a blue LED 524e. The plurality of additional LEDs 524f can be one of red, green, blue and white color LEDs. The two green LEDs 524a and 524c and the two red LEDs 524b and 524d are arranged in a rectangular shape, such as square shape, and the two green LEDs 524a and 524c are opposite to each other. The blue LED 524e is disposed at a center of the square shape. The backlight assembly (220 of FIG. 7) including the LEDs of the above mentioned arrangement emits light having a high color temperature, and the liquid crystal panel (210 of FIG. 7) displays bright images. When the LEDs 524 are top-emitting LEDs, the LED clusters 527 are arranged at a length $l_4$ of about 20-50 mm in both the horizontal and the vertical directions. When the LEDs 524 are side-emitting LEDs, the LED clusters 5227 are arranged at a length $l_4$ of about 40-200 mm in both the horizontal and the vertical directions. Further, the LEDs 524 of the LED clusters 527 are arranged to be separated from each other enough so that the affect of heat emitted from other LEDs is decreased.

It will be apparent to those skilled in the art that various modifications and variations can be made in the substrate for the liquid crystal display device and the method of fabricating the same of the present invention without departing from the sprit or scope of the invention. Thus, it is intended that the present invention covers the modifications and variations of this invention provided they come within the scope of the appended claims and their equivalents.

What is claimed is:

1. A liquid crystal display device, comprising:
   a backlight assembly including:
      a bottom frame having an inner surface;
      a printed circuit board on the inner surface;
      a plurality of light emitting diodes in rectangular-shaped clusters on each of the printed circuit boards, each of the plurality of light emitting diode clusters includes four light emitting diodes;
      a reflecting sheet having through-holes corresponding to the light emitting diodes, the reflecting sheet covering the printed circuit board and the inner surface of the bottom frame;
      a transparent window on the reflecting sheet, the transparent window having diverters corresponding to the four light emitting diodes of each of the light emitting diode clusters; and
      a plurality of optical sheets on the transparent window; and
   a liquid crystal panel on the plurality of optical sheets;
   a main frame surrounding the backlight assembly and the liquid crystal panel; and
   a top frame surrounding a front edge of the liquid crystal panel.

2. A liquid crystal display device, comprising:
   a backlight assembly including:
      a bottom frame having an inner surface;
      a printed circuit board on the inner surface;

a plurality of light emitting diodes in rectangular-shaped clusters on each of the printed circuit boards, each of the plurality of light emitting diode clusters includes five light emitting diodes arranged in a rectangular shape and one light emitting diode of the five light emitting diodes is at a center of the rectangular shape;

a reflecting sheet having through-holes corresponding to the light emitting diodes, the reflecting sheet covering the printed circuit board and the inner surface of the bottom frame;

a transparent window on the reflecting sheet, the transparent window having a plurality of diverters corresponding to the five light emitting diodes of each of the light emitting diode clusters; and a plurality of optical sheets on the transparent window; and a liquid crystal panel on the plurality of optical sheets;

a main frame surrounding the backlight assembly and the liquid crystal panel; and a top frame surrounding a front edge of the liquid crystal panel.

3. The liquid crystal display device according to claim 2, further comprising:

an additional light emitting diode disposed between two adjacent light emitting diode clusters on the printed circuit board.

4. A backlight assembly for a liquid crystal display device, comprising:

a bottom frame having an inner surface;

printed circuit boards on the inner surface; and a plurality of light emitting diodes in rectangular-shaped clusters on each of the printed circuit boards, each of the light emitting diode clusters include four light emitting diodes, wherein a first distance between two adjacent light emitting diode clusters is more than twice a second distance between two adjacent light emitting diodes within the light emitting diode clusters.

5. The backlight assembly according to claim 4, further comprising:

a reflecting sheet having through-holes corresponding to each of the light emitting diodes, the reflecting sheet covering the printed circuit boards and the inner surface of the bottom frame;

a transparent window on the reflecting sheet, the transparent window having diverters corresponding to the four light emitting diodes of each light emitting diode cluster; and a plurality of optical sheets on the transparent window.

6. A backlight assembly for a liquid crystal display device, comprising:

a bottom frame having an inner surface;

printed circuit boards on the inner surface; and a plurality of light emitting diodes in rectangular-shaped clusters on each of the printed circuit boards, each of the light emitting diode clusters include four light emitting diodes, wherein the four light emitting diodes are two green light emitting diodes, a red light emitting diode and a blue light emitting diode, and wherein the two green light emitting diodes are opposite to each other in each of the plurality of light emitting diode clusters.

7. A backlight assembly for a liquid crystal display device, comprising:

a bottom frame having an inner surface;

printed circuit boards on the inner surface; and a plurality of light emitting diodes in rectangular-shaped clusters on each of the printed circuit boards, each of the light emitting diode clusters include four light emitting diodes, wherein the four light emitting diodes are two green light emitting diodes, a red light emitting diode and a blue light emitting diode, and wherein four light emitting diodes on an Nth row printed circuit board have an arrangement in which a blue light emitting diode is on a first side of the cluster and a red light emitting diode is on a second side of the cluster, while another four light emitting diodes on a (N-1)th row printed circuit board have an arrangement in which a red light emitting diode is on the first side of the cluster and a blue light emitting diode is on the second side of the cluster.

8. A backlight assembly for a liquid crystal display device, comprising:

a bottom frame having an inner surface;

printed circuit boards on the inner surface; and a plurality of light emitting diodes in rectangular-shaped clusters on each of the printed circuit boards, each of the light emitting diode clusters include four light emitting diodes, wherein the four light emitting diodes are two green light emitting diodes, a red light emitting diode and a blue light emitting diode, and wherein four light emitting diodes on an Nth row printed circuit board have an arrangement in which a blue light emitting diode is on a first side of the cluster and a red light emitting diode is on a second side of the cluster, while another four light emitting diodes on a (N-1)th row printed circuit board have an arrangement in which a blue light emitting diode is on the first side of the cluster and a red light emitting diode is on the second side of the cluster.

9. A backlight assembly for a liquid crystal display device, comprising:

a bottom frame having an inner surface;

printed circuit boards on the inner surface; and a plurality of light emitting diodes in rectangular-shaped clusters on each of the printed circuit boards, each of the light emitting diode clusters include four light emitting diodes, wherein the light emitting diodes are top-emitting light emitting diodes and the light emitting diode clusters are arranged at a length of about 20-50 mm in one of the horizontal and the vertical directions.

10. A backlight assembly for a liquid crystal display device, comprising:

a bottom frame having an inner surface;

printed circuit boards on the inner surface; and a plurality of light emitting diodes in rectangular-shaped clusters on each of the printed circuit boards, each of the light emitting diode clusters include four light emitting diodes, wherein the light emitting diodes are side-emitting light emitting diodes and the light emitting diode clusters are arranged at a length of about 40-200 mm in one of the horizontal and the vertical directions.

11. A backlight assembly for a liquid crystal display device, comprising:

a bottom frame having an inner surface;

a printed circuit board on the inner surface; and a plurality of light emitting diode clusters on the printed circuit board, each of the plurality of light emitting diode clusters includes five light emitting diodes in which four light emitting diodes of the five light emitting diodes are arranged in a rectangular shape and one light emitting diode of the five light emitting diodes is at a center of the rectangular shape.

12. The backlight assembly according to claim 11, further comprising:
    a reflecting sheet having through-holes corresponding to the light emitting diodes, the reflecting sheet covering the printed circuit board and the inner surface of the bottom frame;
    a transparent window on the reflecting sheet, the transparent window having a plurality of diverters corresponding to the five light emitting diodes of each of the light emitting diode clusters; and
    a plurality of optical sheets on the transparent window.

13. The backlight assembly according to claim 11, wherein the five light emitting diodes include two green light emitting diodes, a red light emitting diode, a blue light emitting diode and a white light emitting diode.

14. The backlight assembly according to claim 13, wherein the two green light emitting diodes, the red light emitting diode and the blue light emitting diode form the rectangular shape.

15. The backlight assembly according to claim 14, wherein the two green light emitting diodes are opposite to each other.

16. The backlight assembly according to claim 11, wherein the plurality of light emitting diode clusters is arranged in a row on the printed circuit board.

17. The backlight assembly according to claim 11, wherein the five light emitting diodes include two green light emitting diodes, two red light emitting diodes and a blue light emitting diode.

18. The backlight assembly according to claim 17, wherein the two green light emitting diodes and the two red light emitting diodes form the rectangular shape.

19. The backlight assembly according to claim 18, wherein the two green light emitting diodes are opposite to each other.

20. The backlight assembly according to claim 19, further comprising an additional light emitting diode disposed between two adjacent light emitting diode clusters on the printed circuit board.

21. The backlight assembly according to claim 20, wherein the additional light emitting diode includes one of red, green, blue and white light emitting diodes.

22. The backlight assembly according to claim 17, further comprising:
    another printed circuit board having another plurality of light emitting diode clusters; and
    additional light emitting diodes disposed between two adjacent light emitting diode clusters on each of the printed circuit boards.

23. The backlight assembly according to claim 22, wherein the two green light emitting diodes are opposite to each other.

24. The backlight assembly according to claim 21, wherein the plurality of light emitting diode clusters is arranged in rows on each of the printed circuit boards.

25. The backlight assembly according to claim 11, wherein a first distance between two adjacent light emitting diode clusters of the plurality of light emitting diode clusters is more than twice a second distance between two adjacent light emitting diodes within each of the light emitting diode clusters.

26. The backlight assembly according to claim 11, wherein the light emitting diodes are top-emitting light emitting diodes and each of the plurality of light emitting diode clusters are arranged at a length of about 20-50 mm in one of the horizontal and the vertical directions.

27. The backlight assembly according to claim 11, wherein the light emitting diodes are side-emitting light emitting diodes and each of the plurality light emitting diode clusters are arranged at a length of about 40-200 mm in one of the horizontal and the vertical directions.

* * * * *